US012634511B2

(12) United States Patent
Joshi et al.

(10) Patent No.: US 12,634,511 B2
(45) Date of Patent: May 19, 2026

(54) MOTION CODING FOR VERTICES IN INTER-CODED BASEMESH FRAME FOR DYNAMIC MESH CODING

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/754,051

(22) Filed: Jun. 25, 2024

(65) Prior Publication Data

US 2025/0024068 A1 Jan. 16, 2025

Related U.S. Application Data

(60) Provisional application No. 63/546,875, filed on Nov. 1, 2023, provisional application No. 63/544,834, filed on Oct. 19, 2023, provisional application No. 63/543,187, filed on Oct. 9, 2023, provisional application No. 63/526,361, filed on Jul. 12, 2023.

(51) Int. Cl.
| | |
|---|---|
| *H04N 19/52* | (2014.01) |
| *H04N 19/105* | (2014.01) |
| *H04N 19/172* | (2014.01) |
| *H04N 19/70* | (2014.01) |

(52) U.S. Cl.
CPC ........... *H04N 19/52* (2014.11); *H04N 19/105* (2014.11); *H04N 19/172* (2014.11); *H04N 19/70* (2014.11)

(58) Field of Classification Search
CPC .... H04N 19/105; H04N 19/172; H04N 19/52; H04N 19/70
See application file for complete search history.

(56) References Cited

U.S. PATENT DOCUMENTS 10,783,668 B2 9/2020 Sinharoy et al.
11,393,132 B2 7/2022 Faramarzi et al.
(Continued)

OTHER PUBLICATIONS

International Search Report and Written Opinion for PCT/KR2024/009773 by Korean Intellectual Property Office dated Oct. 15, 2024.
(Continued)

*Primary Examiner* — Anner Holder

(57) ABSTRACT

An apparatus directed to improvements to motion coding for vertices in an inter-coded basemesh frame is provided. The apparatus receives a compressed bitstream including deduplicate method information and a syntax element, wherein the deduplicate method information indicates whether duplicate vertex information for identifying duplicate vertices is present in the compressed bitstream, the syntax element indicates whether a flag for a duplicate vertex in a submesh frame is present in the compressed bitstream, and the flag indicates whether motion information for the duplicate vertex in the submesh frame is present in the compressed bitstream. If the syntax element indicates that the flag is present in the compressed bitstream, the deduplicate method information indicates that duplicate vertex information for identifying duplicate vertices is not present in the compressed bitstream.

20 Claims, 9 Drawing Sheets

(56)        References Cited

U.S. PATENT DOCUMENTS

| 2019/0141335 A1 | 5/2019 | Nishi et al. | |
| 2019/0197739 A1 | 6/2019 | Sinharoy et al. | |
| 2021/0218994 A1* | 7/2021 | Flynn | G06T 9/001 |
| 2023/0074762 A1* | 3/2023 | Huang | G06T 17/20 |
| 2023/0177736 A1* | 6/2023 | Zhang | G06T 17/20 |
| 2023/0196663 A1 | 6/2023 | Tian et al. | |
| 2023/0377205 A1* | 11/2023 | Tian | G06T 9/001 |
| 2024/0015324 A1* | 1/2024 | Tian | H04N 19/105 |
| 2024/0048763 A1* | 2/2024 | Tian | H04N 19/172 |
| 2024/0233189 A1* | 7/2024 | Graziosi | G06T 9/001 |
| 2024/0314353 A1* | 9/2024 | Tian | H04N 19/54 |

OTHER PUBLICATIONS

Zou, Wenjie et al. "Video-based dynamic mesh coding test model v4.0 user manual", ISO/IEC JTC 1/SC 29/WG 7 N00595. Apr. 2023.

MPEG 3DGH "WD 3.0 of V-DMC", ISO/IEC JTC 1/SC 29/WG 07 N0611. Apr. 2023.

Zou, Wenjie et al. "Video-based dynamic mesh coding test model v5.0 user manual", ISO/IEC JTC 1/SC 29/WG 7 N00665. Jul. 2023.

MPEG 3DGH "WD 4.0 of V-DMC", ISO/IEC JTC 1/SC 29/WG 07 N0680. Jul. 2023.

Kim, Jungsun et al. "[V-DMC] Simplification of the signalling method and derivation process for motion vectors in the basemesh sub-bitstream", ISO/IEC JTC 1/SC 29/WG 7 m62948. Apr. 2023.

MPEG 3DGH "Text of ISO/IEC CD 23090-29 Video-based mesh coding", ISO/IEC JTC 1/SC 29/WG 07 N0885. Apr. 2024.

* cited by examiner

FIG. 5

MOTION CODING FOR VERTICES IN INTER-CODED BASEMESH FRAME FOR DYNAMIC MESH CODING

CROSS REFERENCE TO RELATED APPLICATION

This application claims benefit of U.S. Provisional Application No. 63/526,361 filed on Jul. 12, 2023, U.S. Provisional Application No. 63/543,187 filed on Oct. 9, 2023, U.S. Provisional Application No. 63/544,834 filed on Oct. 19, 2023, and U.S. Provisional Application No. 63/546,875 filed on Nov. 1, 2023, in the United States Patent and Trademark Office, the entire contents of which are hereby incorporated by reference.

TECHNICAL FIELD

The disclosure relates to improvements to dynamic mesh coding, and more particularly to, for example, but not limited to, improvements to motion coding for vertices when a basemesh frame is coded in inter mode.

BACKGROUND

Currently, International Organization for Standardization (ISO)/International Electrotechnical Commission (IEC) subcommittee 29 working group 07 (ISO/IEC SC29/WG07) is working on developing a standard for video-based compression of dynamic meshes. The third test model, vmesh-v4.0, which represents the current status of the standard, was established in the 10th meeting of ISO/IEC SC29 WG07 in Antalya, Turkey in April 2023. Draft specification for video-based compression of dynamic meshes is also available.

In accordance with the third test model v4.0 and the corresponding working draft 3.0 (WD 3.0 of V-DMC, ISO/IEC SC29 WG07 N00611, April 2023), a basemesh frame which may contain less number of vertices than the original mesh may be created. Individual basemesh frames may be coded in inter mode using motion coding.

However, the motion coding is complex and involves searching for duplicate vertices on the decoder side. Therefore, there is a need to simplify motion decoder.

The description set forth in the background section should not be assumed to be prior art merely because it is set forth in the background section. The background section may describe aspects or embodiments of the present disclosure.

SUMMARY

In some embodiments, this disclosure may relate to improvements to the motion coding of vertices in the basemesh frames in the test model vmesh-v4.0 and the corresponding working draft 3.0.

In some embodiments, the Moving Picture Experts Group (MPEG) edgebreaker static mesh codec introduced in the test model vmesh-v4.0 and the working draft 3.0 for compressing basemesh frames in intra mode may be used. This MPEG edgebreaker static mesh codec allows writing of side information to the bitstream to identify duplicate vertices introduced by the basemesh codec. On the decoder side, these duplicate vertices may be removed and the connectivity information may be adjusted appropriately. After removing the duplicate vertices introduced by the static basemesh codec, the reconstructed base mesh frame may be stored in the mesh buffer.

For basemesh frames coded in inter mode, the motion information for each vertex in the reference frame stored in the mesh buffer may be sent. After reconstructing the vertex positions, the reconstructed inter basemesh frame may be stored in the frame buffer without further search for duplicate vertices.

In some embodiments, an apparatus comprises: a communication interface configured to receive a compressed bitstream including deduplicate method information and a syntax element, wherein the deduplicate method information indicates whether duplicate vertex information for identifying duplicate vertices is present in the compressed bitstream, the syntax element indicates whether a flag for a duplicate vertex in a submesh frame is present in the compressed bitstream, and the flag indicates whether motion information for the duplicate vertex in the submesh frame is present in the compressed bitstream; and a processor operably coupled to the communication interface. The processor is configured to decode the syntax element, if the syntax element indicates that the flag for the duplicate vertex in the submesh frame is present in the compressed bitstream, read the flag from the compressed bitstream, decode the motion information for the duplicate vertex based on the flag, and reconstruct the submesh frame based on the motion information for the duplicate vertex, wherein if the syntax element indicates that the flag is present in the compressed bitstream, the deduplicate method information indicates that duplicate vertex information for identifying duplicate vertices is not present in the compressed bitstream.

In some embodiments, the processor is further configured to: if the syntax element indicates that the flag is not present in the compressed bitstream, infer that the flag indicates that the motion information for the duplicate vertex in the submesh frame is present in the compressed bitstream.

In some embodiments, decoding the motion information for the duplicate vertex based on the flag comprises: if the flag indicates that the motion information for the duplicate vertex in the submesh frame is present in the compressed bitstream, reading the motion information for the duplicate vertex from the compressed bitstream.

In some embodiments, if the deduplicate method information indicates that duplicate vertex information for identifying duplicate vertices is present in the compressed bitstream, the deduplicate method information indicates that a default method is used to deduplicate positions.

In some embodiments, if the deduplicate method information indicates that duplicate vertex information for identifying duplicate vertices is present in the compressed bitstream, the syntax element indicates that the flag is not present in the compressed bitstream.

In some embodiments, if the deduplicate method information indicates that duplicate vertex information for identifying duplicate vertices is not present in the compressed bitstream, the deduplicate method information indicates that no method is used to deduplicate positions.

In some embodiments, the processor is further configured to store the reconstructed submesh frame in a mesh buffer to be used as a reference frame for motion coding of inter-coded frames.

In some embodiments, the processor is further configured to store the reconstructed submesh frame in the mesh buffer without invoking any process for searching for duplicate vertices in the reconstructed submesh frame.

In some embodiments, the processor is further configured to store the reconstructed submesh frame in the mesh buffer without invoking any process for removing duplicate vertices in the reconstructed submesh frame.

In some embodiments, a method comprises receiving a compressed bitstream including deduplicate method information and a syntax element, wherein the deduplicate method information indicates whether duplicate vertex information for identifying duplicate vertices is present in the compressed bitstream, the syntax element indicates whether a flag for a duplicate vertex in a submesh frame is present in the compressed bitstream, and the flag indicates whether motion information for the duplicate vertex in the submesh frame is present in the compressed bitstream; decoding the syntax element; if the syntax element indicates that the flag for the duplicate vertex in the submesh frame is present in the compressed bitstream, reading the flag from the compressed bitstream; decoding the motion information for the duplicate vertex based on the flag; and reconstructing the submesh frame based on the motion information for the duplicate vertex. If the syntax element indicates that the flag is present in the compressed bitstream, the deduplicate method information indicates that duplicate vertex information for identifying duplicate vertices is not present in the compressed bitstream.

In some embodiments, the method further comprises: if the syntax element indicates that the flag is not present in the compressed bitstream, inferring that the flag indicates that the motion information for the duplicate vertex in the submesh frame is present in the compressed bitstream.

In some embodiments, decoding the motion information for the duplicate vertex based on the flag comprises: if the flag indicates that the motion information for the duplicate vertex in the submesh frame is present in the compressed bitstream, reading the motion information for the duplicate vertex from the compressed bitstream.

In some embodiments, if the deduplicate method information indicates that duplicate vertex information for identifying duplicate vertices is present in the compressed bitstream, the syntax element indicates that the flag is not present in the compressed bitstream.

In some embodiments, the method of claim further comprises: storing the reconstructed submesh frame in the mesh buffer without invoking any process for searching for duplicate vertices in the reconstructed submesh frame and without invoking any process for removing duplicate vertices in the reconstructed submesh frame to be used as a reference frame for motion coding of inter-coded frames.

In some embodiments, an apparatus comprising: a processor configured to cause: encoding a submesh frame to generate motion information for a duplicate vertex in the submesh frame, and combining deduplicate method information and a syntax element into a compressed bitstream, wherein the deduplicate method information indicates whether duplicate vertex information for identifying duplicate vertices is present in the compressed bitstream, the syntax element indicates whether a flag for the duplicate vertex in the submesh frame is present in the compressed bitstream, and the flag indicates whether the motion information for the duplicate vertex in the submesh frame is present in the compressed bitstream; and a communication interface operably coupled to the processor, the communication interface configured to transmit the compressed bitstream including the deduplicate method information and the syntax element, and wherein if the syntax element indicates that the flag is present in the compressed bitstream, the deduplicate method information indicates that duplicate vertex information for identifying duplicate vertices is not present in the compressed bitstream.

In some embodiments, if the syntax element indicates that the flag is not present in the compressed bitstream, the compressed bitstream includes the motion information for the duplicate vertex in the submesh frame without including the flag in the compressed bitstream.

In some embodiments, if the flag indicates that the motion information for the duplicate vertex in the submesh frame is present in the compressed bitstream, the compressed bitstream includes the motion information for the duplicate vertex.

In some embodiments, if the deduplicate method information indicates that duplicate vertex information for identifying duplicate vertices is present in the compressed bitstream, the deduplicate method information indicates that a default method is used to deduplicate positions.

In some embodiments, if the deduplicate method information indicates that duplicate vertex information for identifying duplicate vertices is present in the compressed bitstream, the syntax element indicates that the flag is not present in the compressed bitstream.

In some embodiments, if the deduplicate method information indicates that duplicate vertex information for identifying duplicate vertices is not present in the compressed bitstream, the deduplicate method information indicates that no method is used to deduplicate positions.

BRIEF DESCRIPTION OF THE DRAWINGS

FIG. 5 illustrates a block diagram for a decoder in accordance with an embodiment.

Figure 1:
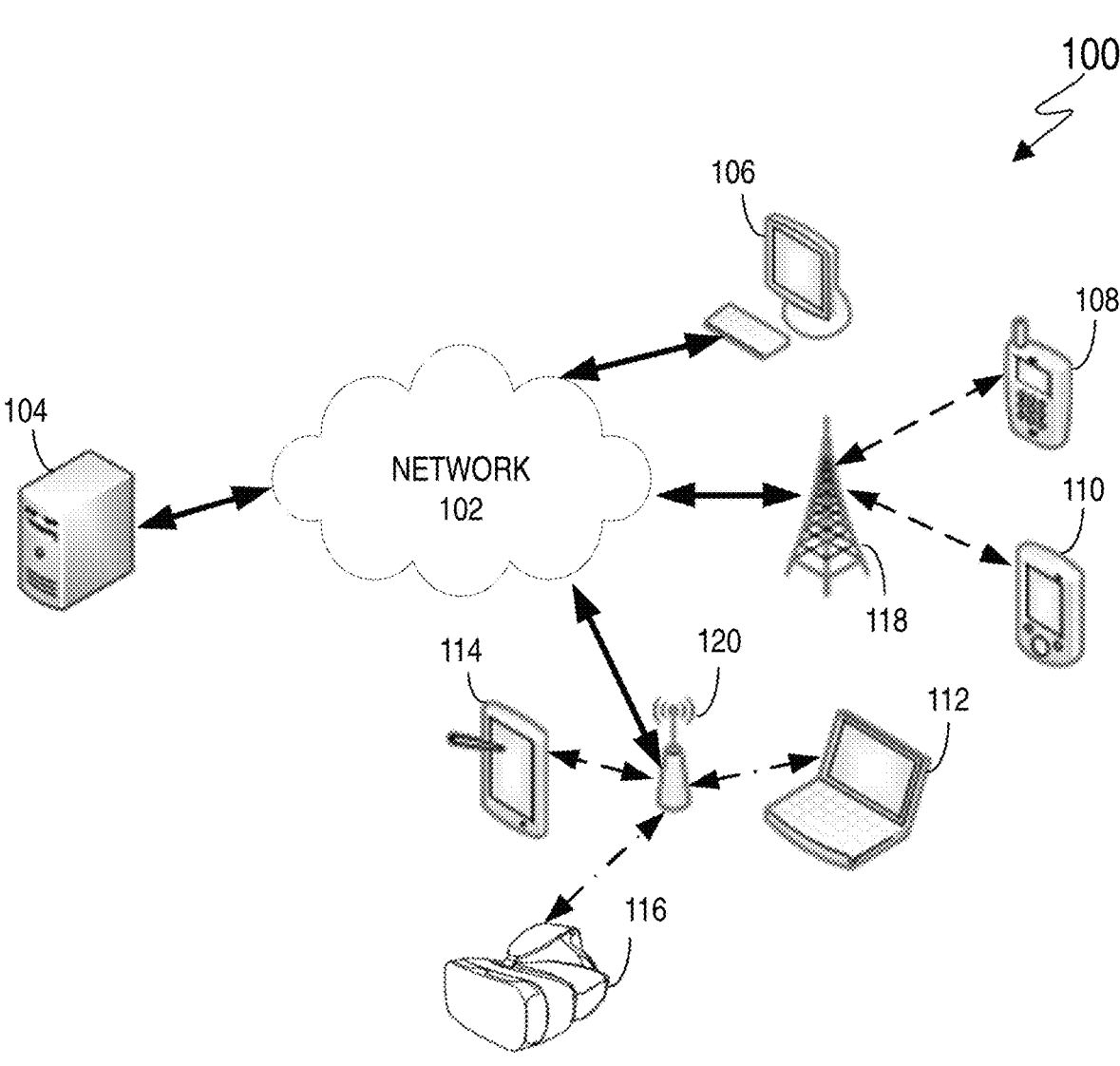
FIG. 1 illustrates an example communication system 100 in accordance with an embodiment of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

Three hundred sixty degree (360°) video and 3D volumetric video are emerging as new ways of experiencing immersive content due to the ready availability of powerful handheld devices such as smartphones. While 360° video enables immersive "real life," "being there" experience for consumers by capturing the 360° outside-in view of the world, 3D volumetric video can provide complete 6DoF experience of being and moving within the content. Users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is three-dimensional (3D) in nature, such as point clouds or 3D polygonal meshes, can be used in the immersive environment.

A point cloud is a set of 3D points along with attributes such as color, normal, reflectivity, point-size, etc. that represent an object's surface or volume. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be transformed into traditional two-dimensional (2D) frames and that can be compressed and later be reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively.

Since point clouds and meshes contain a large amount of data, they require compression for efficient storage and transmission. This is particularly true for dynamic point clouds and meshes, which may contain 60 frames or higher per second.

Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
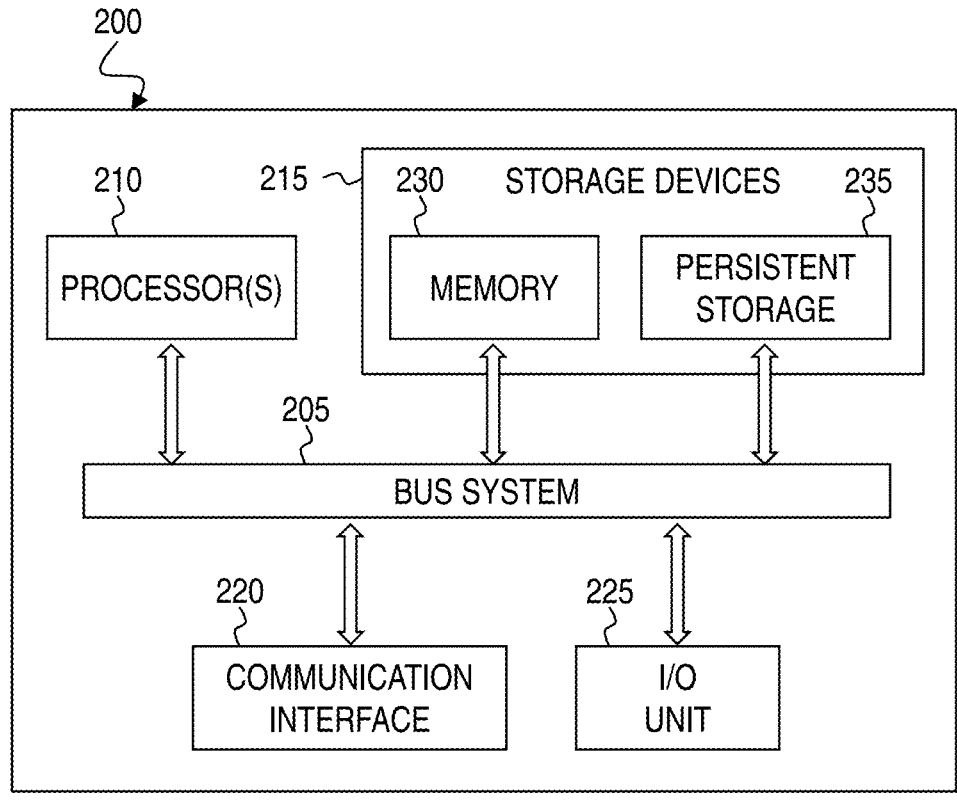
FIGS. 2 and 3 illustrate example electronic devices in accordance with an embodiment of this disclosure.
Figure 3:
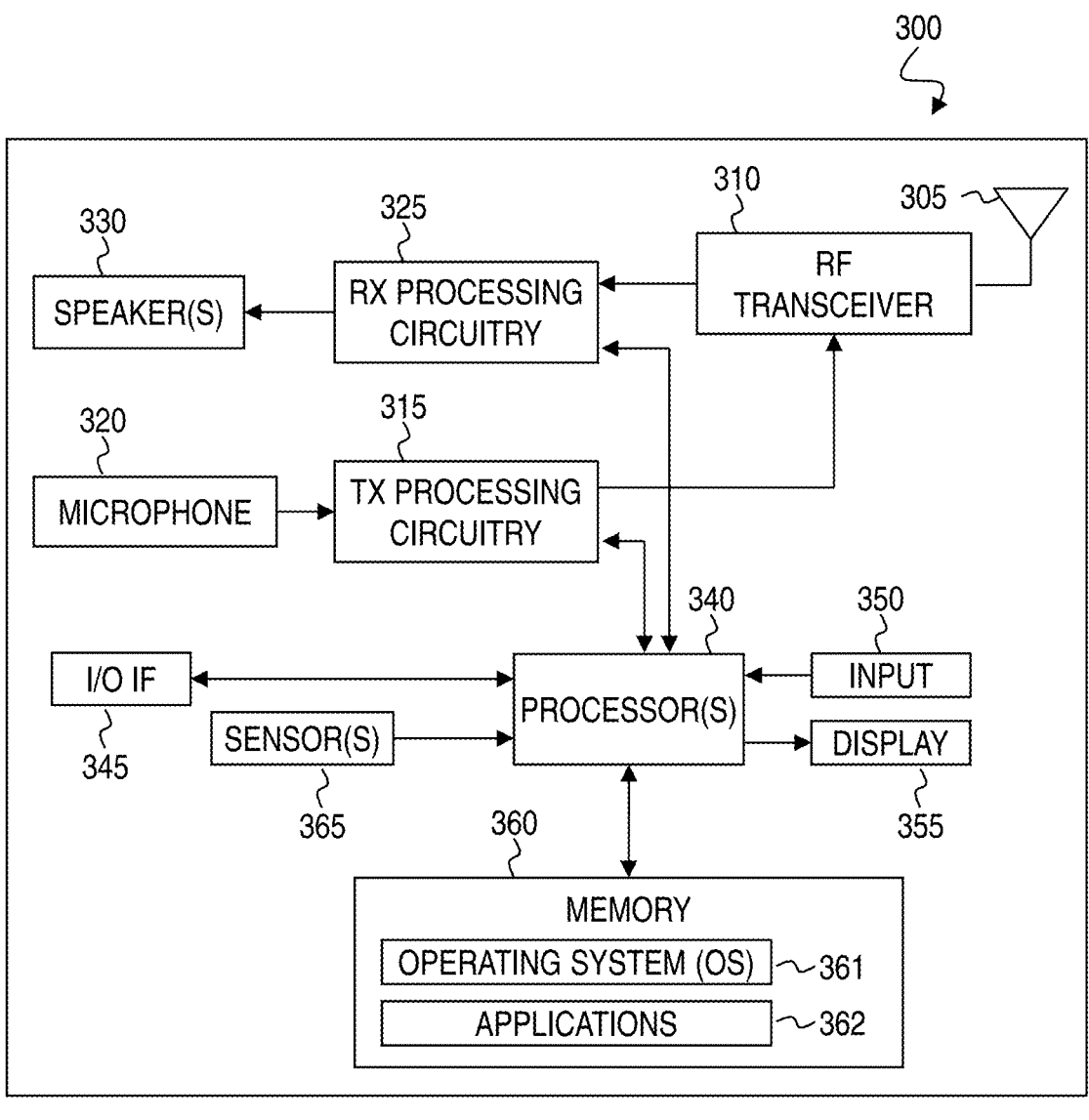

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices

215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
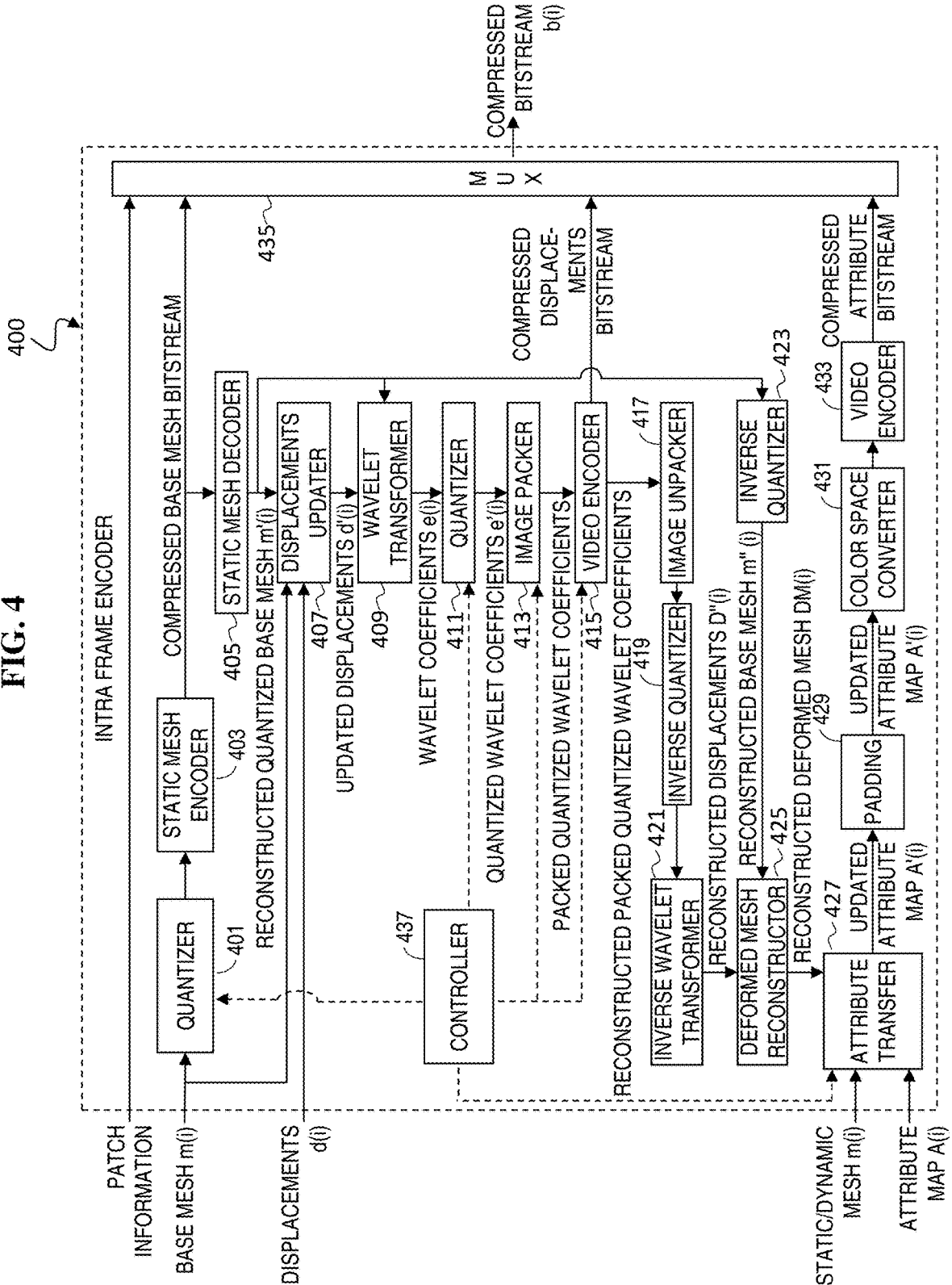
FIG. 4 illustrates a block diagram for an encoder encoding intra frames in accordance with an embodiment.

FIG. 4 illustrates a block diagram for an encoder encoding intra frames in accordance with an embodiment.

As shown in FIG. 4, the encoder 400 encoding intra frames in accordance with an embodiment may comprise a quantizer 401, a static mesh encoder 403, a static mesh decoder 405, a displacements updater 407, a wavelet transformer 409, a quantizer 411, an image packer 413, a video encoder 415, an image unpacker 417, an inverse quantizer 419, an inverse wavelet transformer 421, an inverse quantizer 423, a deformed mesh reconstructor 425, an attribute transfer module 427, a padding module 429, a color space converter 431, a video encoder 433, a multiplexer 435, and a controller 437.

The quantizer 401 may quantize a base mesh m (i) to generate a quantized base mesh. In some embodiments, the base mesh may have fewer vertices compared to an original mesh.

The static mesh encoder 403 may encode and compress the quantized base mesh to generate a compressed base mesh bitstream. In some embodiments, the base mesh may be compressed in a lossy or lossless manner. In some embodiments, an already existing mesh codec such as Draco may be used to compress the base mesh.

The static mesh decoder 405 may decode the compressed base mesh bitstream to generate a reconstructed quantized base mesh m'(i).

The displacements updater 407 may update displacements d(i) based on the base mesh m(i) after subdivision and the reconstructed quantized base mesh m'(i) to generate updated displacements d'(i). The reconstructed base mesh may undergo subdivision and then a displacement field between the original mesh and the subdivided reconstructed base mesh may be calculated. In inter coding of mesh frame, the base mesh may be coded by sending vertex motions instead of compressing the base mesh directly. In either case, a displacement field may be created. The displacement field as well as the modified attribute map may be coded using a video codec and also included as a part of the V-DMC bitstream.

The wavelet transformer 409 may perform a wavelet transform with the updated displacements d'(i) to generate displacement wavelet coefficients e(i). The wavelet transform may comprise a series of prediction and update lifting steps.

The quantizer 411 may quantize the displacement wavelet coefficients e(i) to generate quantized displacement wavelet coefficients e'(i). The quantized displacement wavelet coefficients may be denoted by an array dispQuantCoeffArray.

The image packer 413 may pack the quantized displacement wavelet coefficients e'(i) into a 2D image including packed quantized displacement wavelet coefficients dispQuantCoeffFrame. The 2D video frame may be referred to as a displacement frame or a displacement video frame in this disclosure.

The video encoder 415 may encode the packed quantized displacement wavelet coefficients dispQuantCoeffFrame to generate a compressed displacements bitstream.

The image unpacker 417 may unpack the packed quantized displacement wavelet coefficients dispQuantCoeffFrame to generate an array dispQuantCoeffArray of quantized displacement wavelet coefficients.

The inverse quantizer 419 may inversely quantize the array dispQuantCoeffArray of quantized displacement wavelet coefficients to generate displacement wavelet coefficients.

The inverse wavelet transformer 421 may perform an inverse wavelet transform with the displacement wavelet coefficients to generate reconstructed displacements d"(i).

The inverse quantizer 423 may inversely quantize the reconstructed quantized base mesh m'(i) to generate a reconstructed base mesh m"(i).

The deformed mesh reconstructor 425 may generate a reconstruct deformed mesh DM(i) based on the reconstructed displacements D"(i) and a reconstructed base mesh m"(i).

The attribute transfer module 427 may update an attribute map A(i) based on a static/dynamic mesh m(i) and a reconstructed deformed mesh DM(i) to generate an updated attribute map A'(i). The attribute map may be a texture map but other attributes may be sent as well.

The padding module 429 may perform padding to fill empty areas in the updated attribute map A'(i) so as to remove high frequency components.

The color space converter 431 may perform a color space conversion of the padded updated attribute map A'(i).

The video encoder 433 may encode the output of the color space converter 431 to generate the compressed attribute bitstream.

The multiplexer 435 may multiplex the compressed base mesh bitstream, the compressed displacements bitstream, and the compressed attribute bitstream to generate a compressed bitstream b(i).

The controller 437 may control modules of the encoder 400.

Figure 5:
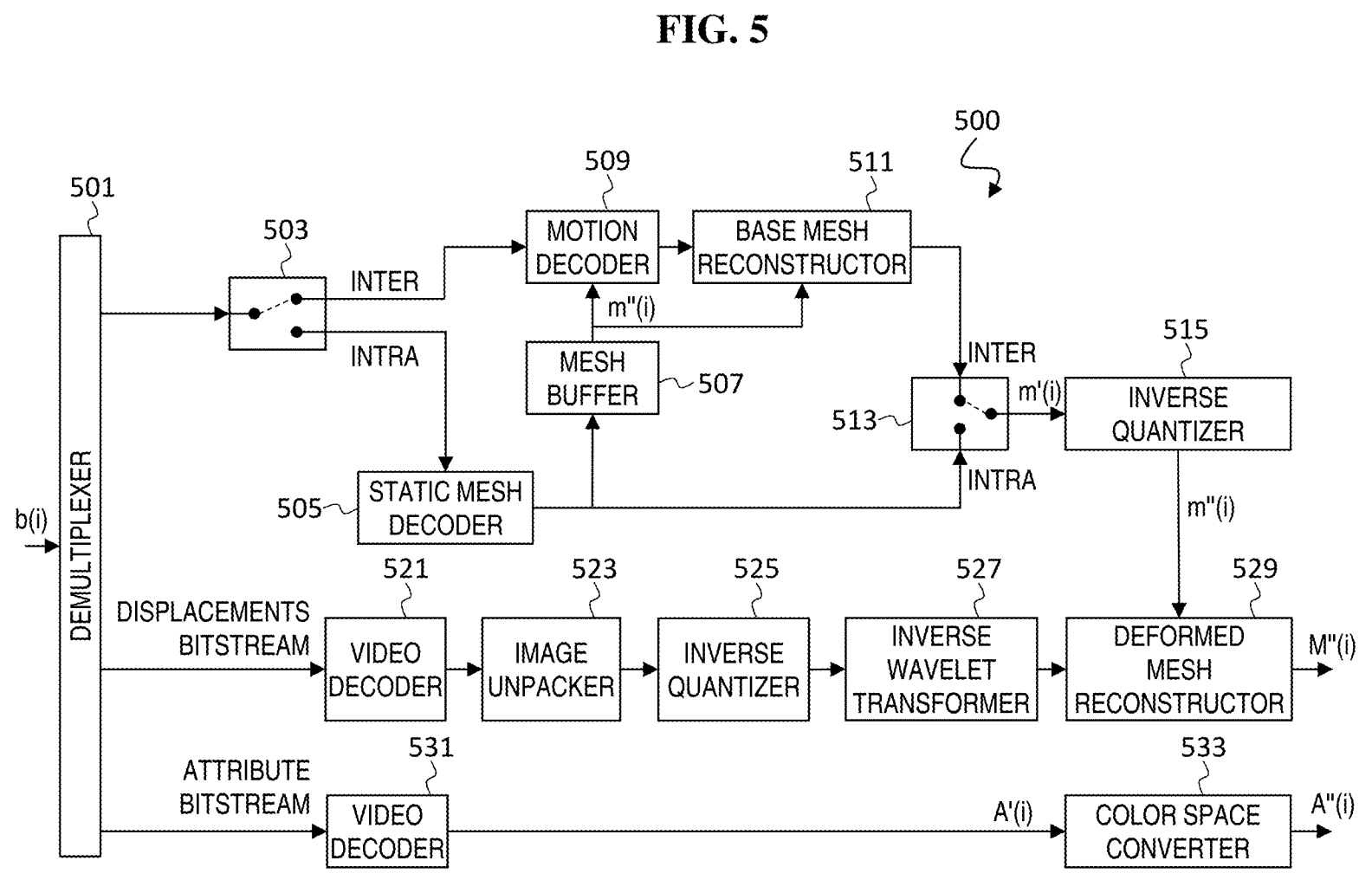

FIG. 5 illustrates a block diagram for a decoder in accordance with an embodiment.

As shown in FIG. 5, the decoder 500 may comprise a demultiplexer 501, a switch 503, a static mesh decoder 505, a mesh buffer 507, a motion decoder 509, a base mesh reconstructor 511, a switch 513, an inverse quantizer 515, a video decoder 521, an image unpacker 523, an inverse quantizer 525, an inverse wavelet transformer 527, a deformed mesh reconstructor 529, a video decoder 531, and a color space converter 533.

The demultiplexer 501 may receive the compressed bitstream b(i) from the encoder 400 to extract the compressed base mesh bitstream, the compressed displacements bitstream, and the compressed attribute bitstream from the compressed bitstream b(i).

The switch 503 may determine whether the compressed base mesh bitstream has an inter-coded mesh frame or an intra-coded mesh frame. If the compressed base mesh bitstream has the inter-coded mesh frame, the switch 503 may transfer the inter-coded mesh frame to the motion decoder 509. If the compressed base mesh bitstream has the intra-coded mesh frame, the switch 503 may transfer the intra-coded mesh frame to the static mesh decoder 505.

The static mesh decoder 505 may decode the intra-coded mesh frame to generate a reconstructed quantized base mesh frame.

The mesh buffer 507 may store the reconstructed quantized base mesh frames and the inter-coded mesh frame for future use of decoding subsequent inter-coded mesh frames. The reconstructed quantized base mesh frames may be used as reference mesh frames.

The motion decoder 509 may obtain motion vectors for a current inter-coded mesh frame based on data stored in the mesh buffer 507 and syntax elements in the bitstream for the current inter-coded mesh frame. In some embodiments, the syntax elements in the bitstream for the current inter-coded mesh frame may be a motion vector difference.

The base mesh reconstructor 511 may generate a reconstructed quantized base mesh frame by using syntax elements in the bitstream for the current inter-coded mesh frame based on the motion vectors for the current inter-coded mesh frame.

The switch 513 may transmit the reconstructed quantized base mesh frame from the static mesh decoder 505 to the inverse quantizer 515, if the compressed base mesh bitstream has the intra-coded mesh frame. The switch 513 may transmit the reconstructed quantized base mesh frame from the static mesh decoder 511 to the inverse quantizer 515, if the compressed base mesh bitstream has the inter-coded mesh frame.

The inverse quantizer 515 may perform an inverse quantization with the reconstructed quantized base mesh frame to generate a reconstructed base mesh frame m"(i).

The video decoder 521 may decode a displacements bitstream to generate packed quantized displacement wavelet coefficients dispQuantCoeffFrame.

The image unpacker 523 may unpack the packed quantized displacement wavelet coefficients dispQuantCoeffFrame to generate an array dispQuantCoeffArray of quantized displacement wavelet coefficients.

The inverse quantizer 525 may perform the inverse quantization with the array dispQuantCoeffArray of quantized displacement wavelet coefficients to generate displacement wavelet coefficients.

The inverse wavelet transformer 527 may perform the inverse wavelet transform with displacement wavelet coefficients to generate displacements.

The deformed mesh reconstructor 529 may reconstruct a deformed mesh based on the displacements and the reconstructed base mesh frame m"(i).

The video decoder 531 may decode the attribute bitstream to generate an attribute map before a color space conversion.

The color space converter 533 may perform a color space conversion of the attribute map from the video decoder 531 to reconstruct the attribute map.

The following documents are hereby incorporated by reference in their entirety into the present disclosure as if fully set forth herein: i) V-DMC TMM4.0, ISO/IEC SC29 WG07 N00595, April 2023, ii) "WD 3.0 of V-DMC", ISO/IEC SC29 WG07 N00611, April 2023, iii) "V-DMC Test Model v5 (TMM v5)", ISO/IEC SC29 WG07 N00665, July 2023, iv) "WD 4.0 of V-DMC", ISO/IEC SC29 WG07 N00680, July 2023, and v) "[V-DMC] Simplification of the signalling method and derivation process for motion vectors in the basemesh sub-bitstream", ISO/IEC SC29 WG07 m62948, April 2023.

For each mesh frame, the encoder 400 may create a basemesh. The basemesh typically has less number of vertices compared to the original mesh. The encoder 400 may compress the basemesh either in a lossy or lossless manner. Each basemesh frame may be compressed in intra or inter mode. In intra mode, the basemesh frame may be compressed using the MPEG EdgeBreaker static mesh codec either defined in Annex I of WD 3.0 of V-DMC or an external static mesh codec. In the case of inter mode, the position of each vertex in the basemesh may be predicted based on a corresponding vertex in the reconstructed reference basemesh frame or positions of already decoded neighboring vertices. Then, the difference between the prediction and the actual position of the current vertex may be coded or inferred as motion information or a motion vector. This may be referred to as motion coding. In addition, displacement and texture videos may also be generated and compressed.

The decoder 500 may decode and reconstruct each basemesh frame based on whether it was coded in intra or inter mode. The reconstructed basemesh may undergo subdivision to produce a subdivided mesh. The displacement video may be decoded to extract the displacement field corresponding to each vertex in the subdivided mesh. Then the displacement field may be added to the subdivided mesh.

In some embodiments, this disclosure may relate to simplification of motion coding for vertices when a basemesh frame is coded in inter mode. For motion coding, one or more previously decoded and reconstructed basemesh frames are used. These previously decoded and reconstructed basemesh frames may be stored in the mesh buffer 507. When inter mode is used, it may be assumed that the number of vertices and their connectivity for the current basemesh frame is the same as that for the reference frame.

The motion coding process in the test model vmesh-v4.0 and the corresponding working draft WD 3.0 may be summarized as follows. The reconstructed reference basemesh frame may be processed to search duplicate vertex positions. The duplicate vertex positions may be generated mainly for two reasons. One reason is that the basemesh codec may create duplicate vertices. This is typically done when the mesh is non-manifold. Since the connectivity remains the same between the reference basemesh frame and the current basemesh frame, the duplicate vertices that are created by the basemesh codec also remain the same. Another reason may be that quantization of vertex positions may create duplicate vertex positions.

The test model vmesh-v4.0 motion decoder may form a unique vertex index list corresponding to unique vertex positions in the reconstructed reference basemesh. For each entry in the unique vertex index list, a corresponding vertex position vector stores the vertex position. The decoder also may form a duplicate vertex index list. Each entry in duplicate vertex index list points to a corresponding vertex index in the unique vertex index list. Typically, a vertex from the duplicate vertex index list may have the same motion vector as the corresponding vertex from unique vertex index list. The encoder 400 may encode information in the bitstream about the number of indices from the duplicate vertex index list that have different motion vectors compared to their corresponding unique vertices. The encoder 400 may also encode information regarding the indices of these duplicate vertices in the duplicate vertex index list.

For motion decoding, it is necessary for the decoder to process the reference basemesh to identify duplicate vertex positions. This can be a computational complex operation and is hard to parallelize. A method which eliminates the need for identifying duplicate vertex positions on the decoder side and simplifies the syntax and decoding process for motion coding is proposed.

In this disclosure, it is assumed that a basemesh consists of a single submesh. A basemesh may be divided into multiple submeshes. Hereinafter, apparatus and method for encoding and decoding a submesh frame or a basemesh frame will be described, but the apparatus and method may be applied to separately encode and decode some or all submesh frames if the basemesh frame is divided into multiple submesh frames.

Figure 6:
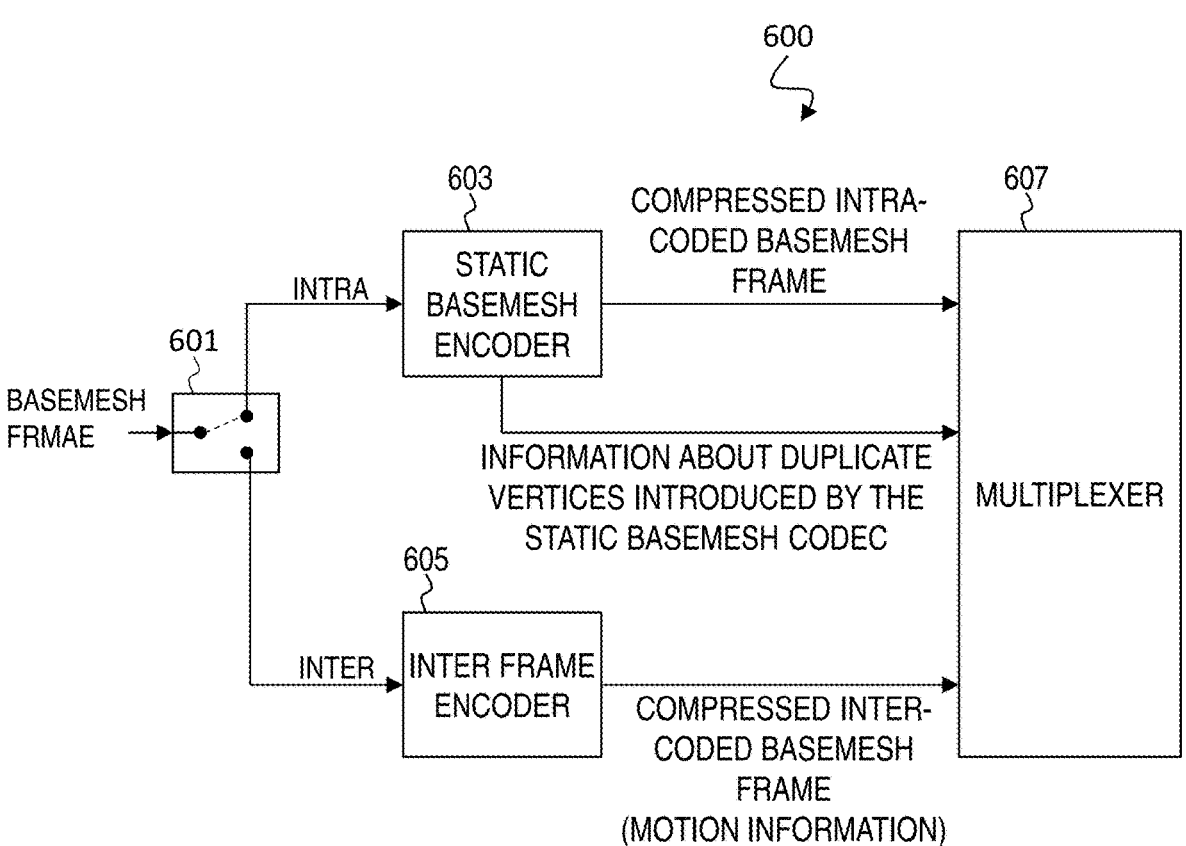
FIG. 6 shows a block diagram of a basemesh encoder in accordance with an embodiment.

FIG. 6 shows a block diagram of a basemesh encoder in accordance with an embodiment.

Referring to FIG. 6, the basemesh encoder 600 in accordance with an embodiment includes an encoding mode determinator 601, a static basemesh encoder 603, an inter frame encoder 605, and a multiplexer 607. The basemesh encoder 600 shown in FIG. 6 encodes a basemesh frame but it may separately encode some or all submesh frames.

The intra encoding mode determinator 601 may determine whether a current basemesh frame is coded in intra mode or in inter mode.

If the current basemesh frame is determined to be coded in intra mode, the static basemesh encoder 603 may encode the current basemesh frame by using a static basemesh codec to generate a compressed intra-coded basemesh frame. In some embodiments, the static basemesh encoder 603 may introduce duplicate vertices into the intra-coded basemesh frame when encoding the basemesh frame by using the static basemesh codec. The static basemesh encoder 603 may generate information about duplicate vertices that have been introduced by the static basemesh codec.

If the current submesh frame is determined to be coded in inter mode, the inter frame encoder 605 may encode the current basemesh frame in inter mode to generate motion information of vertices as a compressed inter-coded basemesh frame. The motion information of vertices may be motion vectors of vertices.

The multiplexer 607 may combine the compressed intra-coded basemesh frame, information about duplicate vertices introduced by the static basemesh codec, and the inter-coded basemesh frame into a compressed basemesh bitstream.

As describe above, on the encoder side, when a basemesh frame is encoded in intra mode using a basemesh codec, additional data related to the duplicate vertices that have been introduced by the basemesh codec may be written to the compressed basemesh bitstream. In some embodiments, the bitstream may not include information for duplicate vertices caused by quantization of vertex positions.

Figure 7:
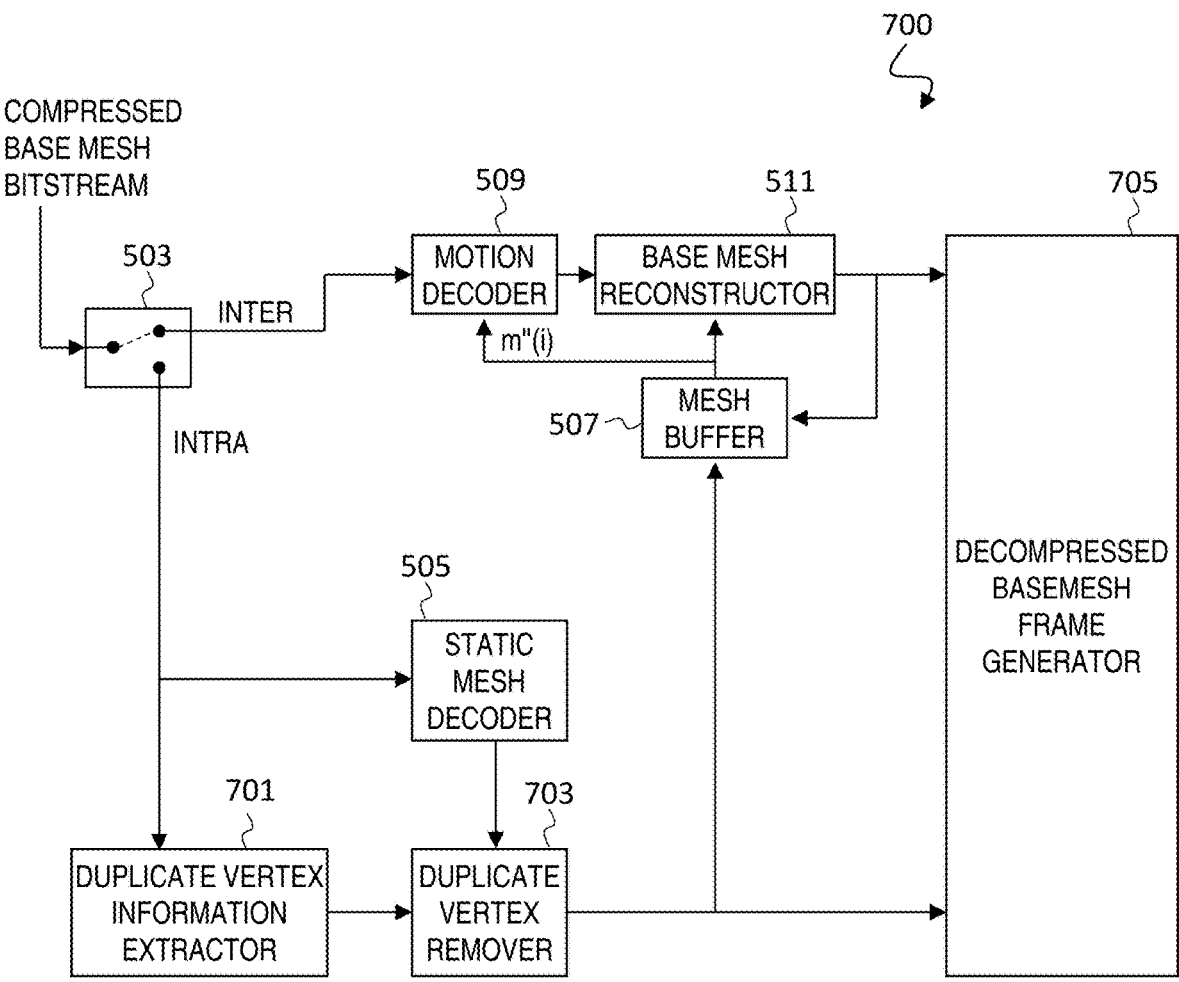
FIG. 7 shows the block diagram of the basemesh decoder in accordance with an embodiment.

FIG. 7 shows the block diagram of the basemesh decoder in accordance with an embodiment.

In some embodiment, the basemesh decoder 700 shown in FIG. 7 may be a part of the decoder 500 shown in FIG. 5. Like reference numerals designate like elements. As shown in FIG. 7, the basemesh decoder 700 may comprise the switch 503, the static mesh decoder 505, a duplicate vertex information extractor 701, a duplicate vertex remover 703, the mesh buffer 507, the motion decoder 509, the base mesh reconstructor 511, and a decompressed basemesh frame generator 705.

The basemesh decoder 700 shown in FIG. 7 decodes a basemesh frame but it may separately decode some or all submesh frames.

The switch 503 may determine whether the compressed basemesh bitstream has an inter-coded basemesh frame or an intra-coded basemesh frame. If the compressed basemesh bitstream has the inter-coded basemesh frame, the switch 503 may transfer the inter-coded basemesh frame to the motion decoder 509. If the compressed basemesh bitstream has the intra-coded basemesh frame, the switch 503 may transfer the intra-coded basemesh frame to the static mesh decoder 507.

The static mesh decoder 505 may decode the intra-coded basemesh frame to generate a reconstructed quantized basemesh frame.

The duplicate vertex information extractor 701 may extract duplicate vertex information from the compressed basemesh bitstream.

The duplicate vertex remover 703 may eliminate duplicate vertices in the reconstructed quantized basemesh frame by using the duplicate vertex information to generate a cleaned reconstructed basemesh frame.

The mesh buffer 507 may store the cleaned reconstructed basemesh frame for future use of decoding subsequent inter-coded basemesh frames. The cleaned reconstructed quantized basemesh frames may be used as reference basemesh frames.

The motion decoder 509 may obtain motion vectors for a current inter-coded basemesh frame based on data stored in the mesh buffer 507 and syntax elements in the bitstream for the current inter-coded basemesh frame. In some embodiments, the syntax elements in the bitstream for the current inter-coded basemesh frame may indicate a motion vector difference.

The base mesh reconstructor 511 may generate a reconstructed quantized basemesh frame by using syntax elements in the bitstream for the current inter-coded basemesh frame based on the motion vectors for the current inter-coded basemesh frame. In some embodiments, the base mesh reconstructor 511 may generate a reconstructed quantized basemesh frame without invoking any process for removing duplicate vertices. The reconstructed quantized basemesh frame may be stored in the mesh buffer 507 without invoking any process for removing duplicate vertices.

The decompressed basemesh frame generator 705 may generate decompressed basemesh frames. In some embodiments, if the current basemesh frame is intra-coded, for each vertex in the current basemesh frame, the decompressed basemesh frame generator 705 may inversely quantize a prediction difference for a current vertex and add the inverse quantized prediction difference and a prediction position for the current vertex to reconstruct a position of the current vertex. In some embodiments, if the current basemesh frame is inter-coded, for each vertex in the current basemesh frame, the decompressed basemesh frame generator 705 may inversely quantize a motion vector for a current vertex and add the inverse quantized motion vector and a position corresponding to the current vertex in a reference basemesh frame to reconstruct a position of the current vertex.

As described above, on the decoder side, if the basemesh frame is coded in intra mode, the basemesh decoder 700 may decode and reconstruct the basemesh frame using a basemesh codec. The basemesh decoder 700 may also read the additional data related to the duplicate vertices introduced by the basemesh codec. Based on the additional data related to the duplicate vertices, the basemesh decoder 700 may eliminate the duplicate vertices introduced by the basemesh codec and adjusts the connectivity information regarding, for example, but not limited to, connections and triangles, to generate a cleaned basemesh frame. The cleaned basemesh frame may be stored in mesh buffer 507 to be used as a reference for motion coding of future basemesh frames coded in inter mode. In some embodiments, the basemesh codec may be the MPEG EdgeBreaker static mesh codec.

In some embodiments, duplicate vertex information for identifying duplicate vertices introduced by the basemesh codec may be included in the bitstream when a syntax element mesh_position_deduplicate_method is equal to MESH_POSITION_DEDUP_DEFAULT. In some embodiments, duplicate vertex information for identifying duplicate vertices introduced by the basemesh codec may not be included in the bitstream when a syntax element mesh_position_deduplicate_method is equal to MESH_POSITION_DEDUP_NONE. The syntax element mesh_position_deduplicate_method may specify a method used to deduplicate positions. In some embodiments, allowed values for the syntax element mesh_position_deduplicate_method may include MESH_POSITION_DEDUP_NONE, and MESH_POSITION_DEDUP_DEFAULT. The syntax element mesh_position_deduplicate_method equal to MESH_POSITION_DEDUP_DEFAULT may indicate that a default method is used to deduplicate positions. The syntax element mesh_position_deduplicate_method equal to MESH_POSITION_DEDUP_NONE may indicate that no method is used to deduplicate positions. The value of the MESH_POSITION_DEDUP_NONE may be equal 0 and the value of the MESH_POSITION_DEDUP_DEFAULT may be equal 1.

In some embodiments, the duplicate vertex information may include a syntax element mesh_position_deduplicate_count, a syntax element mesh_position_deduplicate_idx[i] (0≤i<mesh_position_deduplicate_count), a syntax element mesh_position_deduplicate_start_positions, a syntax element mesh_position_is_duplicate_size, and a syntax element mesh_position_is_duplicate_flag[i] (0≤i<NumVertices). The syntax element mesh_position_deduplicate_count may specify the number of duplicated vertices. The syntax element mesh_position_deduplicate_idx[i] (0≤i<mesh_position_deduplicate_count) may specify a value that is common to duplicated vertices sharing a common parent. The syntax element mesh_position_deduplicate_start_positions may specify the size of the mesh_position_start array. The syntax element mesh_position_is_duplicate_size may specify the size in bytes of the arithmetically coded sequence of binary duplicate indications mesh_position_is_duplicate_flag[i], including the final byte alignment. The syntax element mesh_position_is_duplicate_flag[i] (0≤i<NumVertices) may specify whether the i-th decoded vertex is a duplicated vertex. The syntax element mesh_position_is_duplicate_flag[i] equal to 1 may specify that the i-th decoded vertex is a duplicated vertex and the syntax element mesh_position_is_duplicate_flag[i] equal to 0 may specify that the i-th decoded vertex is not a duplicated vertex.

In some embodiments, the vmesh motion decoder may not need to search the vertex positions in the reference frame to identify duplicate vertices. This information may already be included in the bitstream when the reference basemesh frame is intra-coded. The computational complexity of eliminating the duplicate vertices introduced by basemesh codec is fairly low compared to searching for duplicate vertex positions.

In some embodiments, for a basemesh frame coded in inter mode, positions and connectivity of the reconstructed vertices may be directly stored in the mesh buffer 507 without any further processing to identify and/or eliminate duplicate vertices.

In some embodiments, motion information related to each vertex in the reference frame stored in the mesh buffer 507 may be written to the bitstream on the encoder side and decoded on the decoder side. This is different from the test model vmesh-v4.0 and the corresponding working draft WD 3.0 in that the test model vmesh-v4.0 typically does not send motion information for duplicate vertices unless the corresponding motion vectors are different.

The basemesh encoder 600 has the basemesh decoder 700 built into it. Hence the basemesh encoder 600 may maintain an identical mesh buffer that is used to perform motion prediction and coding for inter frames. Furthermore, for submesh frame coded in intra mode, the duplicate vertices introduced by the basemesh codec may be eliminated and the connectivity information for connections and triangles may be adjusted to generate a cleaned basemesh frame. The cleaned basemesh frame may be stored in mesh buffer 507 on the encoder side to be used as a reference for motion coding of future basemesh frames coded in inter mode. Similarly, the reconstructed basemesh frames coded in inter mode may be stored in mesh buffer 507 without further processing to remove duplicate vertices.

In some embodiments, reconstructed basemesh frames stored in the mesh buffer 507 to be used as reference for motion coding may still contain some duplicate vertex positions due to quantization of vertex positions. However, no further processing may be performed to eliminate those duplicate vertices. For each vertex of a plurality of vertices in the cleaned reference basemesh frame stored in the mesh buffer 507, the position of the corresponding vertex in the current basemesh frame may be predicted based on the position of the corresponding vertex in the reference frame or already decoded and reconstructed neighboring vertices in the current basemesh frame. The prediction residual may be coded using an exponential Golomb or similar code. In some embodiments, the prediction of vertex position and coding of prediction residual may be performed as specified in the test model vmesh-v4.0 and the corresponding working draft WD 3.0.

In some embodiments, for each submesh frame coded in inter mode using motion coding, a syntax element sismu_derived_mv_present_flag[subMeshID] may be decoded. The syntax element sismu_derived_mv_present_flag[subMeshID] may indicate whether a syntax element sismu_mv_signalled_flag[subMeshID][v] is present in the compressed basemesh bitstream. In some embodiments, the syntax element sismu_derived_mv_present_flag [subMeshID] equal to 1 may indicate that the motion vector signalled flag sismu_mv_signalled_flag[subMeshID][v] is present in the compressed basemesh bitstream, and the syntax element sismu_derived_mv_present_flag[subMeshID] equal to 0 may indicate that the motion vector signalled flag sismu_mv_signalled_flag[subMeshID][v] is not present in the compressed basemesh bitstream. In some embodiments, if the syntax element sismu_derived_mv_present_flag[subMeshID] is equal to 0, the syntax element sismu_mv_signalled_flag[subMeshID][v] may always be inferred as 1. If the derived motion vector present flag sismu_derived_mv_present_flag[subMeshID] is equal to 1, for each vertex with index v, the syntax element sismu_mv_signalled_flag[subMeshID][v] may be sent. The syntax element sismu_mv_signalled_flag[subMeshID][v] for the duplicate vertex with index v of the current submesh with submesh ID equal to subMeshID may indicate whether a motion vector for the duplicate vertex with index v of the current submesh with submesh ID equal to subMeshID is present in the bitstream. In some embodiments, the syntax element sismu_mv_signalled_flag[subMeshID][v] equal to 1 may indicates that a motion vector for the duplicate vertex with index v of the current submesh with submesh ID equal to subMeshID is present in the bitstream, and the syntax element sismu_mv_signalled_flag[subMeshID][v] equal to 0 may indicates that a motion vector for the duplicate vertex with index v of the current submesh with submesh ID equal to subMeshID is not present in the bitstream. When the syntax element sismu_mv_signalled_flag[subMeshID][v] is not present in the bitstream, the syntax element sismu_mv_signalled_flag[subMeshID][v] may be inferred as 1. In some embodiments, the basemesh decoder 700 still may perform a search for duplicate vertices on the basemesh of the reference frame. In some embodiments, if the bitstream contains information related to duplicate vertices introduced by the basemesh codec, when coding motion data, the syntax elements sismu_derived_mv_present_flag and sismu_mv_signalled_flag may not be sent. In some embodiments, the motion information for each vertex may be sent. In some embodiments, no search for duplicate vertices may be performed.

In some embodiments, on the encoder side, if the basemesh encoder 600 writes information related to duplicate vertices introduced by the basemesh codec to the bitstream, it also may set the value of the syntax element sismu_derived_mv_present_flag equal to to 0 for the inter coded frames on which motion coding is performed. This may eliminate the need for sending the syntax element sismu_mv_signalled_flag for each vertex and also eliminate the search for duplicate points on the decoder side. This may also reduce the time required for basemesh decoding.

The following Table 1 shows the average run-time savings for base mesh decoding averaged over 4 runs and 5 rates for 32 frames for common test condition (CTC) C2 for 4 sequences that use motion coding. As shown in Table 1, the decoder in accordance with an embodiment may decrease the decoding time for a basemesh frame.

TABLE 1

| Sequence | % decrease in base mesh decoding time (averaged over 5 rates) |
| --- | --- |
| soldier | 20.62 |
| levi | 8.44 |
| mitch | 8.82 |
| thomas | 0.09 |

In some embodiments, a bitstream conformance constraint may be imposed as follows. It is a requirement of bitstream conformance that if the basemesh encoder 600 writes information related to duplicate vertices introduced by the basemesh codec to the bitstream, the value of the syntax element sismu_derived_mv_present_flag in the bitstream shall be equal to 0.

In some embodiments, if the MPEG edgebreaker codec is being used as the basemesh codec and if the value of the syntax element mesh_position_deduplicate_method is equal to MESH_POSITION_DEDUP_DEFAULT, then it is a requirement of bitstream conformance that the value of the syntax element sismu_derived_mv_present_flag shall be equal to 0.

In some embodiments, the syntax element sismu_derived_mv_present_flag may not be sent explicitly. By default, the value the syntax element sismu_derived_mv_present_flag may be set to 1. If the MPEG edgebreaker codec is being used as the basemesh codec and if the value of the syntax element mesh_position_deduplicate_method is equal to MESH_POSITION_DEDUP_DEFAULT, then the syntax element sismu_derived_mv_present_flag may be set equal to 0. In this scenario, the syntax element sismu_mv_signalled_flag may not be signaled and no duplicate vertex search may be performed.

In some embodiments, a bitstream conformance constraint may be added to the V-DMC specification. In one embodiment a following bitstream conformance constraint may be added to the semantics of the syntax element sismu_derived_mv_present_flag in V-DMC as Basemesh inter submesh data unit semantics:

The syntax element sismu_derived_mv_present_flag[subMeshID] may indicate sismu_mv_signalled_flag is present in the bitstream. If the syntax element sismu_derived_mv_present_flag[subMeshID] is 0, the syntax element sismu_mv_signalled_flag[subMeshID][v] may always be inferred as 1.

It is a requirement of bitstream conformance that if sismu_derived_mv_present_flag[subMeshID] is 1, the value of the syntax element mesh_position_deduplicate_method, if present, shall be equal to MESH_POSITION_DEDUP_NONE.

In some embodiments, the syntax element mesh_position_deduplicate_method may be indexed with subMeshID.

In some embodiments, if the bitstream contains information related to duplicate vertices introduced by the basemesh codec, this information may be used by the decoder 700 to clean the reconstructed reference basemeshes by eliminating these duplicate vertices and the motion decoding as described above may be used. If the bitstream does not contain information related to duplicate vertices introduced by the basemesh codec, another motion decoding method may be used. In some embodiments, the another motion decoding method may be as described in the test model vmesh-v4.0 and the corresponding working draft WD 3.0. In one embodiment, the another motion decoding method may be as described in "[V-DMC] Simplification of the signalling method and derivation process for motion vectors in the basemesh sub-bitstream", ISO/IEC SC29 WG07 m62948, April 2023. In some embodiments, the bitstream may contain a flag to indicate whether information related to duplicate vertices introduced by the basemesh codec is included in the bitstream.

Figure 8:
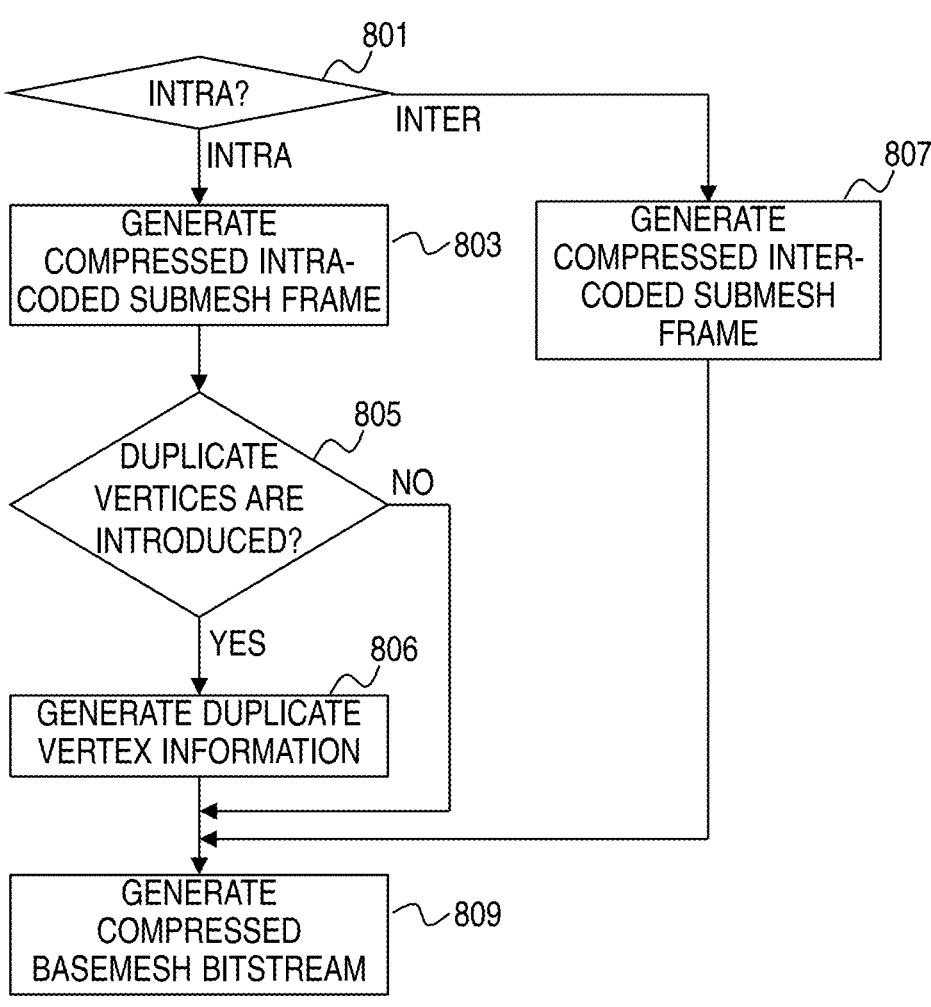
FIG. 8 is a flowchart showing operations of the basemesh encoder in accordance with an embodiment.

FIG. 8 is a flowchart showing operations of the basemesh encoder in accordance with an embodiment.

Referring FIG. 8, the basemesh encoder 600 encodes a submesh frame but it may encode a basemesh frame or may separately encode some or all submesh frames in the basemesh frame if the basemesh frame is divided into a plurality of submesh frames.

At 801, the basemesh encoder 600 may determine whether a current submesh frame is coded in intra mode or in inter mode.

If the current submesh frame is determined to be coded in intra mode, the basemesh encoder 600 may encode the current submesh frame by using a basemesh codec to generate compressed intra-coded submesh frame at 803.

In some embodiments, the static basemesh encoder 603 may introduce duplicate vertices into intra-coded submesh frame when encoding the submesh frame by using the basemesh codec. If the static basemesh encoder 603 may introduce duplicate vertices at 805, the static basemesh encoder 603 may generate duplicate vertex information about duplicate vertices that have been introduced by the basemesh codec at 806.

If the current submesh frame is determined to be coded in inter mode, the basemesh encoder 600 may encode the current submesh frame in inter mode to generate a compressed inter-coded submesh frame at 807. In some embodiments, the compressed inter-coded submesh frame may be in the form of motion information or may include motion information.

The basemesh encoder 600 may combine the compressed intra-coded submesh frames and motion information from inter-coded submesh frames into a compressed basemesh bitstream at 809. If the static basemesh encoder 603 may introduce duplicate vertices, the basemesh encoder 600 may combine the duplicate vertex information and the syntax element mesh_position_deduplicate_method set equal to 1 into the bitstream.

In some embodiments, it is a requirement of bitstream conformance that if the syntax element sismu_derived_mv_present_flag[subMeshID] is equal to 1 for a submesh with submesh ID equal to subMeshID, the syntax element mesh_position_deduplicate_method, if present, shall be equal to MESH_POSITION_DEDUP_NONE.

In some embodiments, it is a requirement of bitstream conformance that if the syntax element mesh_position_deduplicate_method is equal to MESH_POSITION_DEDUP_DEFAULT, the syntax element sismu_derived_mv_present_flag[subMeshID] shall be equal to 0 for a submesh with submesh ID equal to subMeshID.

In some embodiments, if the syntax element sismu_derived_mv_present_flag [subMeshID] is equal to 1, the basemesh encoder 600 may combine the syntax elements sismu_mv_signalled_flag[subMeshID][i] (0≤i<vertexCount) for each i-th vertex in the current submesh frame into the bitstream. The variable vertexCount may indicate the number of vertices in the current submesh frame. If the syntax element sismu_mv_signalled_flag[subMeshID][i] is equal to 0, the basemesh encoder 600 may not combine syntax elements indicating motion information for the i-th vertex in the current submesh frame. If the syntax element sismu_mv_signalled_flag[subMeshID][i] is equal to 1, the basemesh encoder 600 may combine syntax elements indicating motion information for the i-th vertex in the current submesh frame.

In some embodiments, if the syntax element sismu_derived_mv_present_flag [subMeshID] is equal to 0, the basemesh encoder 600 may not combine the syntax elements sismu_mv_signalled_flag[subMeshID][i] (0≤i<vertexCount) for each i-th vertex in the current submesh frame into the bitstream, but infer values of the syntax elements sismu_mv_signalled_flag[subMeshID][i] (0≤i<vertexCount) as 1 and syntax elements indicating motion information for the i-th vertex in the current submesh frame.

Figure 9:
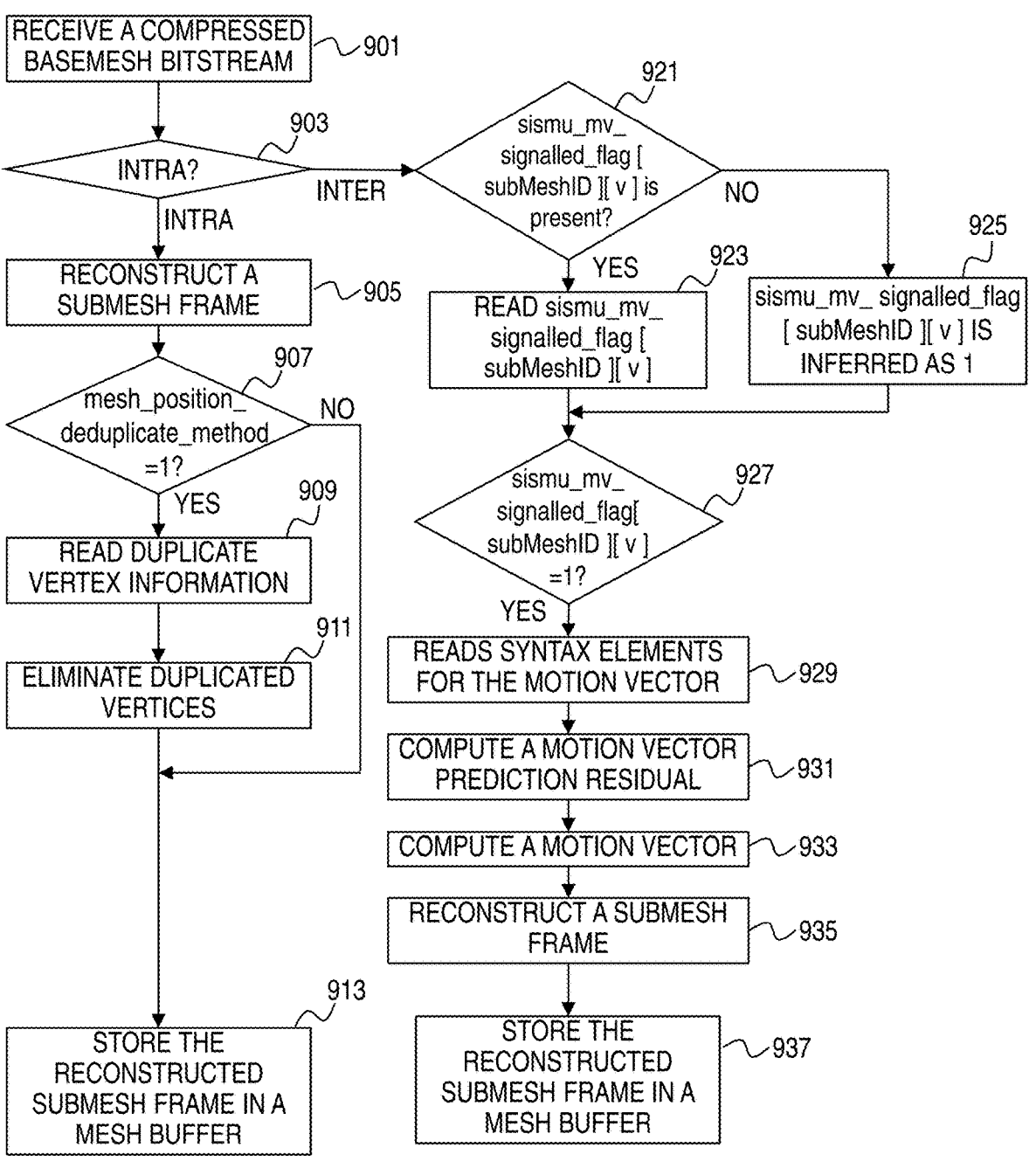
FIG. 9 is a flowchart showing operations of the basemesh decoder in accordance with an embodiment.

FIG. 9 is a flowchart showing operations of the basemesh decoder in accordance with an embodiment.

Referring FIG. 9, the basemesh decoder 700 decodes a submesh frame but it may decode a basemesh frame or may separately decode some or all submesh frames in the basemesh frame if the basemesh frame is divided into a plurality of submesh frames.

At 901, the basemesh decoder 700 may receive a compressed basemesh bitstream.

At 903, the basemesh decoder 700 may determine whether a current submesh frame in the compressed basemesh bitstream is coded in intra mode or in inter mode.

If the basemesh decoder 700 determines that the current submesh frame is coded in intra mode, the basemesh decoder 700 may decode an intra-coded submesh frame in the compressed basemesh bitstream using a basemesh codec to reconstruct the current submesh frame, at 905.

At 907, the basemesh decoder 700 may read the syntax element mesh_position_deduplicate_method in the compressed basemesh bitstream and check whether the value of the syntax element mesh_position_deduplicate_method is equal to 1.

If the value of the syntax element mesh_position_deduplicate_method is equal to 1, the basemesh decoder 700 may read duplicate vertex information related to duplicate vertices from the compressed basemesh bitstream at 909. In some embodiments, the duplicate vertex information may be data related to duplicate vertices introduced by the basemesh codec.

At 911, the basemesh decoder 700 may eliminate duplicate vertices and adjust connectivity information in the reconstructed submesh frame based on the duplicate vertex information to generate a cleaned reconstructed submesh frame.

At 913, the basemesh decoder 700 may store the cleaned reconstructed submesh frame in the mesh buffer 507 to be used as a reference for motion coding of future submesh frames coded in inter mode, if the deduplicate method information specifies that a default method is used to deduplicate positions. If the deduplicate method information specifies that no method is used to deduplicate positions, the basemesh decoder 700 may recognize that the compressed basemesh bitstream does not include duplicate vertex information related to duplicate vertices, may not read the duplicate vertex information from the compressed basemesh bitstream, and may store the reconstructed submesh frame in the mesh buffer 507 to be used as a reference for motion coding of future submesh frames coded in inter mode.

If the basemesh decoder 700 determines that the current submesh frame is coded in inter mode, the basemesh decoder 700 may read and check a syntax element indicating whether the motion vector signalled flag sismu_mv_signalled_flag[subMeshID][v] for each v of the current submesh with submesh ID is present in the bitstream. For example, the basemesh decoder 700 may read the syntax element sismu_derived_mv_present_flag[subMeshID] for the current submesh with submesh ID equal to subMeshID and check whether the value of the syntax element sismu_derived_mv_present_flag[subMeshID] is equal to 1, at 921.

In some embodiments, it is a requirement of bitstream conformance that if the syntax element sismu_derived_mv_present_flag[subMeshID] is equal to 1 for a submesh with submesh ID equal to subMeshID, the syntax element mesh_position_deduplicate_method, if present, shall be equal to MESH_POSITION_DEDUP_NONE.

In some embodiments, it is a requirement of bitstream conformance that if the syntax element mesh_position_deduplicate_method is equal to MESH_POSITION_DEDUP_DEFAULT, the syntax element sismu_d- erived_mv_present_flag[subMeshID] is equal to 0 for a submesh with submesh ID equal to subMeshID.

If the derived motion vector present flag sismu_derived_mv_present_flag [subMeshID] is equal to 1, the basemesh decoder 700 reads the motion vector signalled flag sismu_mv_signalled_flag[subMeshID][v] for each v of the current submesh with submesh ID at 923.

If the derived motion vector present flag sismu_derived_mv_present_flag [subMeshID] is equal to 0, at 925, the basemesh decoder 700 may infer that the motion vector signalled flag sismu_mv_signalled_flag[subMeshID][v] for each v of the current submesh with submesh ID indicates that a motion vector for the vertex with index v of the current submesh with submesh ID equal to subMeshID is present in the bitstream.

At 927, for each vertex with index v of the current submesh with submesh ID equal to subMeshID, the basemesh decoder 700 may determine whether the motion vector signalled flag sismu_mv_signalled_flag[subMeshID][v] indicates that a motion vector for the vertex with index v of the current submesh with submesh ID equal to subMeshID is present in the bitstream.

If the motion vector signalled flag sismu_mv_signalled_flag[subMeshID][v] indicates that a motion vector for the vertex with index v of the current submesh with submesh ID equal to subMeshID is present in the bitstream, the basemesh decoder 700 reads syntax elements for the motion vector for the vertex with index v of the current submesh with submesh ID equal to subMeshID, at 929.

For each vertex with index v of the current submesh with submesh ID equal to subMeshID, the basemesh decoder 700 may compute a motion vector prediction residual based on the syntax elements for the motion vector, at 931.

For each vertex with index v of the current submesh with submesh ID equal to subMeshID, the basemesh decoder 700 may compute a motion vector based on the motion vector prediction residual, at 933.

At 935, the basemesh decoder 700 may derive vertex positions based on the motion vectors and a reference submesh frame in the mesh buffer to generate a reconstructed submesh frame.

At 937, the basemesh decoder 700 may store the reconstructed submesh in the mesh buffer 507 without invoking any process for removing duplicate vertices.

The various illustrative blocks, units, modules, components, methods, operations, instructions, items, and algorithms may be implemented or performed with processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, the description may provide illustrative examples and the various features may be grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The embodiments are provided solely as examples for understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus comprising:
a communication interface configured to receive a compressed bitstream including a first syntax element indicating deduplicate method information and a second syntax element, wherein the deduplicate method information indicates whether duplicate vertex information for identifying duplicate vertices is present in the compressed bitstream, the second syntax element indicates whether a flag for a duplicate vertex in a submesh frame is present in the compressed bitstream, and the flag indicates whether motion information for the duplicate vertex in the submesh frame is present in the compressed bitstream; and
a processor operably coupled to the communication interface, the processor configured to:
decode the second syntax element,
if the second syntax element indicates that the flag for the duplicate vertex in the submesh frame is present in the compressed bitstream, read the flag from the compressed bitstream,
decode the motion information for the duplicate vertex based on the flag, and
reconstruct the submesh frame based on the motion information for the duplicate vertex,
wherein if the second syntax element indicates that the flag is present in the compressed bitstream, the deduplicate method information indicates that duplicate vertex information for identifying duplicate vertices is not present in the compressed bitstream.

2. The apparatus of claim 1, wherein the processor is further configured to:
if the second syntax element indicates that the flag is not present in the compressed bitstream, infer that the flag indicates that the motion information for the duplicate vertex in the submesh frame is present in the compressed bitstream.

3. The apparatus of claim 1, wherein decoding the motion information for the duplicate vertex based on the flag comprises:
if the flag indicates that the motion information for the duplicate vertex in the submesh frame is present in the compressed bitstream, reading the motion information for the duplicate vertex from the compressed bitstream.

4. The apparatus of claim 1, wherein if the deduplicate method information indicates that duplicate vertex information for identifying duplicate vertices is present in the compressed bitstream, the deduplicate method information indicates that a default method is used to deduplicate positions.

5. The apparatus of claim 1, wherein if the deduplicate method information indicates that duplicate vertex information for identifying duplicate vertices is present in the compressed bitstream, the second syntax element indicates that the flag is not present in the compressed bitstream.

6. The apparatus of claim 5, wherein if the deduplicate method information indicates that duplicate vertex information for identifying duplicate vertices is not present in the compressed bitstream, the deduplicate method information indicates that no method is used to deduplicate positions.

7. The apparatus of claim 1, wherein the processor is further configured to:
store the reconstructed submesh frame in a mesh buffer to be used as a reference frame for motion coding of inter-coded frames.

8. The apparatus of claim 7, wherein the processor is further configured to:
store the reconstructed submesh frame in the mesh buffer without invoking any process for searching for duplicate vertices in the reconstructed submesh frame.

9. The apparatus of claim 7, wherein the processor is further configured to:
store the reconstructed submesh frame in the mesh buffer without invoking any process for removing duplicate vertices in the reconstructed submesh frame.

10. A method comprising:
receiving a compressed bitstream including a first syntax element indicating deduplicate method information and a second syntax element, wherein the deduplicate method information indicates whether duplicate vertex information for identifying duplicate vertices is present in the compressed bitstream, the second syntax element indicates whether a flag for a duplicate vertex in a submesh frame is present as a syntax element in the compressed bitstream, and the flag indicates whether motion information for the duplicate vertex in the submesh frame is present in the compressed bitstream;
decoding the second syntax element;
if the second syntax element indicates that the flag for the duplicate vertex in the submesh frame is present in the compressed bitstream, reading the flag from the compressed bitstream;
decoding the motion information for the duplicate vertex based on the flag; and
reconstructing the submesh frame based on the motion information for the duplicate vertex, wherein if the second syntax element indicates that the flag is present in the compressed bitstream, the deduplicate method information indicates that duplicate vertex information for identifying duplicate vertices is not present in the compressed bitstream.

11. The method of claim 10, further comprising:

if the second syntax element indicates that the flag is not present in the compressed bitstream, inferring that the flag indicates that the motion information for the duplicate vertex in the submesh frame is present in the compressed bitstream.

12. The method of claim 10, wherein decoding the motion information for the duplicate vertex based on the flag comprises:

if the flag indicates that the motion information for the duplicate vertex in the submesh frame is present in the compressed bitstream, reading the motion information for the duplicate vertex from the compressed bitstream.

13. The method of claim 10, wherein if the deduplicate method information indicates that duplicate vertex information for identifying duplicate vertices is present in the compressed bitstream, the second syntax element indicates that the flag is not present in the compressed bitstream.

14. The method of claim 13, further comprising:

storing the reconstructed submesh frame in a mesh buffer without invoking any process for searching for duplicate vertices in the reconstructed submesh frame and without invoking any process for removing duplicate vertices in the reconstructed submesh frame to be used as a reference frame for motion coding of inter-coded frames.

15. An apparatus comprising:

a processor configured to cause:

encoding a submesh frame to generate motion information for a duplicate vertex in the submesh frame, and combining a first syntax element indicating deduplicate method information and a second syntax element into a compressed bitstream, wherein the deduplicate method information indicates whether duplicate vertex information for identifying duplicate vertices is present in the compressed bitstream, the second syntax element indicates whether a flag for the duplicate vertex in the submesh frame is present as a syntax element in the compressed bitstream, and the flag indicates whether the motion information for the duplicate vertex in the submesh frame is present in the compressed bitstream; and a communication interface operably coupled to the processor, the communication interface configured to transmit the compressed bitstream including the deduplicate method information and the second syntax element, and wherein if the second syntax element indicates that the flag is present in the compressed bitstream, the deduplicate method information indicates that duplicate vertex information for identifying duplicate vertices is not present in the compressed bitstream.

16. The apparatus of claim 15, wherein if the second syntax element indicates that the flag is not present in the compressed bitstream, the compressed bitstream includes the motion information for the duplicate vertex in the submesh frame without including the flag in the compressed bitstream.

17. The apparatus of claim 15, wherein if the flag indicates that the motion information for the duplicate vertex in the submesh frame is present in the compressed bitstream, the compressed bitstream includes the motion information for the duplicate vertex.

18. The apparatus of claim 15, wherein if the deduplicate method information indicates that duplicate vertex information for identifying duplicate vertices is present in the compressed bitstream, the deduplicate method information indicates that a default method is used to deduplicate positions.

19. The apparatus of claim 15, wherein if the deduplicate method information indicates that duplicate vertex information for identifying duplicate vertices is present in the compressed bitstream, the second syntax element indicates that the flag is not present in the compressed bitstream.

20. The apparatus of claim 19, wherein if the deduplicate method information indicates that duplicate vertex information for identifying duplicate vertices is not present in the compressed bitstream, the deduplicate method information indicates that no method is used to deduplicate positions.

* * * * *